United States Patent [19]

Miller

[11] 4,439,854
[45] Mar. 27, 1984

[54] VIDEO DISC STYLUS

[75] Inventor: Michael E. Miller, Indianapolis, Ind.

[73] Assignee: RCA Corporation, New York, N.Y.

[21] Appl. No.: 292,058

[22] Filed: Aug. 12, 1981

[51] Int. Cl.³ .............................................. G11B 9/06
[52] U.S. Cl. .................................. 369/126; 369/151; 369/173
[58] Field of Search ............... 369/126, 150, 151, 170, 369/173

[56] References Cited

U.S. PATENT DOCUMENTS

| 4,104,832 | 8/1978 | Keizer .................... | 51/281 R |
| 4,162,510 | 7/1979 | Keizer .................... | 358/128 |
| 4,164,755 | 8/1979 | Matsumoto ............... | 358/128 |
| 4,165,560 | 8/1979 | Matsumoto ............... | 29/630 R |
| 4,398,282 | 8/1983 | Segawa .................... | 369/173 |

FOREIGN PATENT DOCUMENTS 55-135342 10/1980 Japan ................................. 369/126

Primary Examiner—Alan Faber
Attorney, Agent, or Firm—Birgit E. Morris; Donald S. Cohen; Joseph D. Lazar

[57] ABSTRACT

A playback stylus comprising a dielectric support element having a conical end, two flats in the conical end, and a constricted terminal portion defined by side surfaces, shoulders interconnecting the side surfaces and the flats, a prow defined by a first region between the flats, a second region remote from the prow and a disc engaging surface defined by the prow, side surfaces, and the second region.

1 Claim, 4 Drawing Figures

VIDEO DISC STYLUS

This invention relates to a capacitive information disc playback stylus and a method for its manufacture.

BACKGROUND OF THE INVENTION

U.S. Pat. Nos. 4,164,755 and 4,165,560 of Matsumoto discloses a pick-up stylus for use with a capacitive information disc. The stylus is fabricated from a tapered diamond support element having a plurality of conical portions with a common axis. Two of the conical portions are separated by an electrode bearing surface. A record engaging the surface is provided in a tip region substantially orthogonal to the electrode bearing surface. The diamond support element includes a pair of converging flat surfaces in the tip region which are deposed such that the intersection of the converging flat surfaces with the record engaging surface defines the side edges of the record engaging surface. The intersection of the converging flat surfaces with a conical portion remote from the electrode bearing surface forms a prow.

The stylus of Matsumoto may be manufactured by grinding a conical surface at one end of a diamond element. An electrode bearing surface is formed in the region of the conical tip and a record engaging surface is made substantially orthogonal to the electrode bearing surface.

Keizer in U.S. Pat. Nos. 4,104,832 and 4,162,510 has disclosed a capacitive information disc keel-tipped playback stylus. The terminating portion of the stylus is shaped to have a prow, a substantially flat rear surface remote from the prow, a pair of substantially parallel side surfaces extending from the side edges of the rear surface, a bottom surface extending from the bottom edge of the rear surface, and additional surfaces extending from the prow intersecting the bottom and side surfaces.

The keep tip stylus may be formed with an abrasive lapping disc having a deep, coarse-pitched groove. The tip is fabricated from a tapering support element having a tip which is defined by a prow and a substantially flat, "V"-shaped rear surface remote from the prow. The lands of the lapping disc lap the shoulders of the stylus and the walls of the abrasive groove form the substantially parallel side surfaces.

In order to reduce the cost of manufacturing a capacitive information disc playback stylus, it is advantageous to have a dielectric support element, such as diamond, sapphire and the like, mounted on a shank which may be, for example, a metal such as titanium. Such styli are common for use with audio records. Audio styli often have a conical-shaped tip. However, since the width of the information track in a capacitive information disc is substantially smaller than the information track recorded in an audio record, the terminal portion of the dielectric support element must be appropriately shaped.

One method of employing a shanked dielectric support element in a capacitive information disc playback stylus may be found in the copending application of Dholakia entitled "Playback Stylus and its Manufacture", Ser. No. 292,057, filed Aug. 12, 1981. A dielectric support element having a conical body terminating at a constricted tip is employed in which a flat surface on which a conductive layer may be prepared is lapped in the tip region followed by the formation of a disc engaging structure such as a keel tip.

I have found an alternate inexpensive means for converting a shanked dielectric support element to a relatively low cost capacitive information disc playback stylus.

SUMMARY OF THE INVENTION

I have found a playback stylus which may be used with a capacitive information disc having an information track recorded as geometric surface variations. The stylus includes a dielectric support element having a conical end, two flats in the conical end, and a constricted terminal portion defined by side surfaces, shoulders interconnecting the side surfaces and the flat, a prow defined by a first conical region between the flats a second region remote from the prow, and a disc engaging surface defined by the prow, the side surfaces, and the second region.

I have also found a method for fabricating the playback stylus from a dielectric element having a conical end. The steps include forming a first flat in the conical end, forming a second flat in the conical end, and forming a terminal region in the conical end which includes a disc engaging surface.

DETAILED DESCRIPTION OF THE INVENTION

Figure 1:
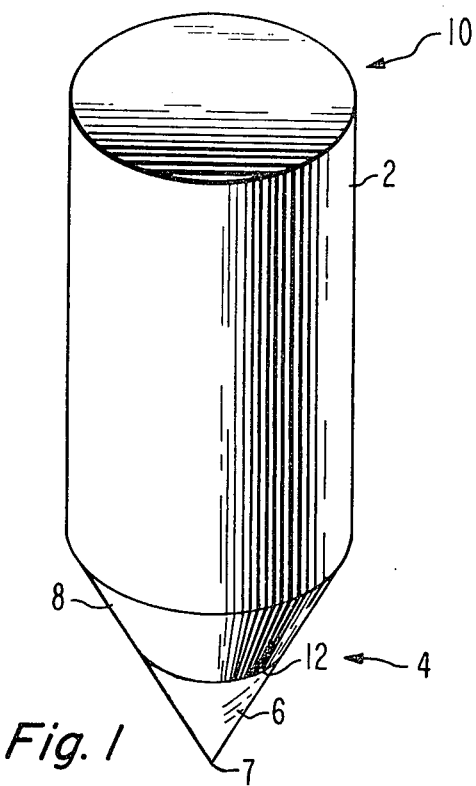
FIG. 1 is a perspective view of a stylus element.

The present invention will be illustrated by means of the Drawing. FIG. 1 is a perspective view of a stylus element 10. The stylus element 10 includes a shank 2 and a conical tip region 4. The shank 2 material may be, for example, a metal such as titanium. The tip region consists of two components 6 and 8. The first tip region component 6 terminates at the tip end 7 and includes the tip region 4 which will contact the capacitive information disc, not shown, during playback. The first tip region component 6 is generally of a hard dielectric material such as diamond, sapphire, and the like. The second tip region component 8 may be fabricated, for example, from the same material as either the first tip region component 6 or the shank 2 material. An interface 12 between the second tip region component 8 and the first tip region component 6 is illustrated for the case wherein the first and second tip region components, 6 and 8, respectively, are fabricated from different materials. The two tip region components 6 and 8 may be bonded at the interface 12 by brazing, soldering, or by any other suitable method known in the art. A reference surface, not shown, may be machined into the stylus element 10 to orient it for the lapping operations. For example, the reference surface may be a flat along the shank 2 which extends into the second tip region component 8.

Figure 2:
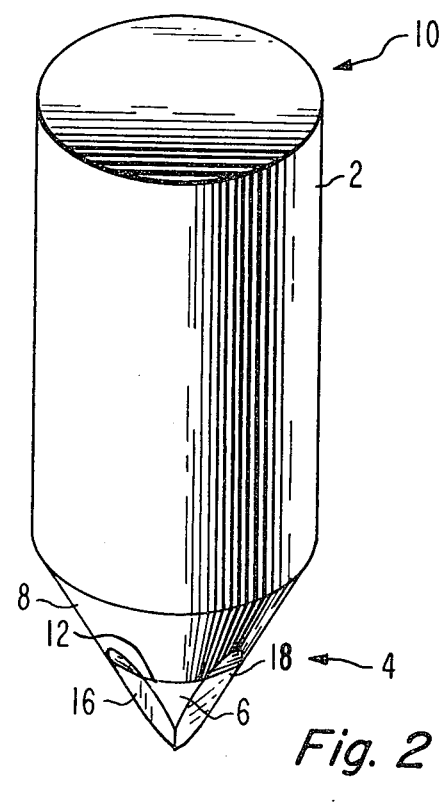
FIG. 2 is a perspective view of a stylus element having two flats.

FIG. 2 is a perspective view of a stylus element 10 in which a first flat 16 and a second flat 18 have been lapped. The first flat 16 and second flat 18 may be lapped so that they are parallel to each other or they may converge as in shown in FIG. 2. The degree of convergence determines the sharpness of the prow.

In lapping the flats any convenient method may be employed. For lapping a first tip region component 6 which is of diamond, a diamond powder having an average particle diameter of between about 0.1 to 0.25 micrometer may be employed as a charge on a scaif surface which acts as the abrasive lapping surface.

A convenient method to employ when two flats of substantially equal area are required is the flip-flop grinding method of Dholakia is disclosed in the co-pending application entitled, "Flip-Flop Grinding Method," Ser. No. 292,284, filed Aug. 12, 1981, is incorporated herein by reference.

A grinding apparatus which may be employed is disclosed in the co-pending application of Dholakia, et al, entitled, "Grinding Apparatus", Ser. No. 292,283, filed Aug. 12, 1981, which is incorporated herein by reference.

Figure 3:
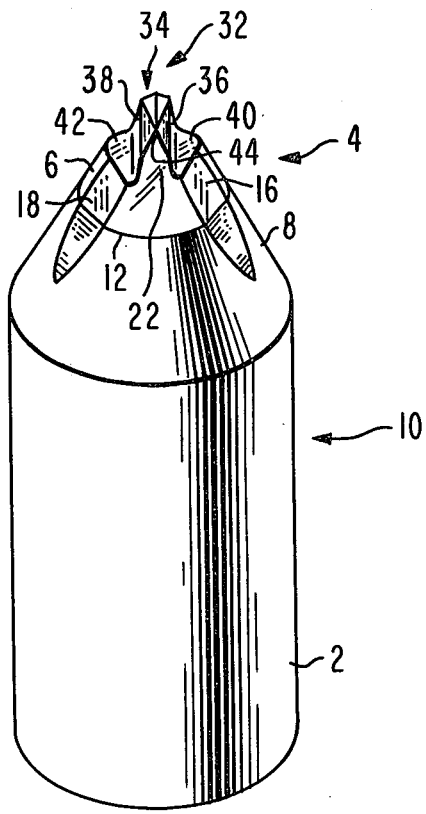
FIGS. 3 and 4 are perspective views of a stylus of the present invention.
Figure 4:
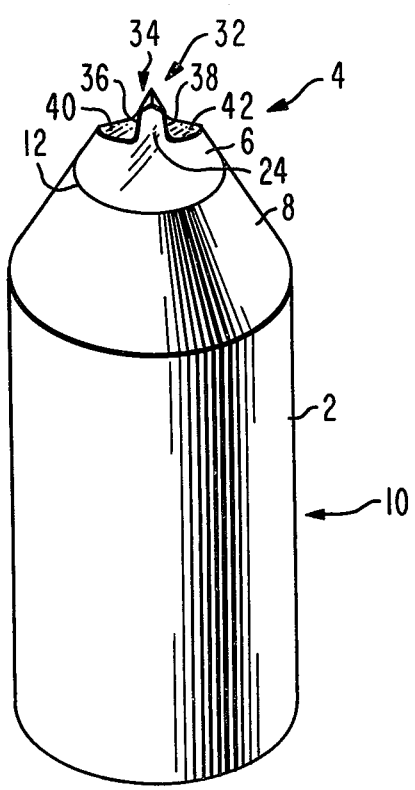

FIGS. 3 and 4 are perspective views of a stylus element 10 showing a keel tip 32 formed in the tip region 4. The keel tip 32 includes a bottom surface 34 which engages the capacitive information disc. If the capacitive information disc includes a groove in its surface, the bottom surface 34 is generally shaped to conform to the groove, typically a "V"-shape. The keel tip 32 also includes sides 36 and 38 and shoulders 40 and 42 which are joined to their respective sides by means of a concave junction. A prow 44 is formed by the intersection by the first flat 16 and the second flat 18 as well as a portion of the conical body 22. The width of an electrode surface 24 at the keel tip is defined by a first side 36 and a second side 38. The width of the electrode surface 24 is generally less than or equal to the width of the information track in the capacitive information disc.

The angle between the electrode surface 24 and the bottom surface 34 may be any convenient or desired angle. A preferred angle is about 90 degrees. The stylus element 10 is generally mounted in a cartridge at an angle such that the bottom surface 34 engages the capacitive information disc surface.

The degree of curvature of the electrode surface 24 may influence the performance properties of the stylus. Too large a curvature can result in non-uniform capacitive variation between the disc signal elements and the electrode surface 24. As a result, a noisy signal having a lower signal-to-noise ratio may be generated. There is a trade-off between the cone angle and the flatness of the electrode surface. A larger cone angle results in an electrode surface 24 which more nearly approximates a flat surface. However, a large cone angle requires more material to be removed during the keel lapping operation.

Although a keel tip is shown other record engaging terminating portions may be employed.

The conical portion of the stylus element 10 generally has an axis which is also the major axis of the stylus element 10 but noncorresponding axes may also be employed.

Any desirable cone angle may be employed. Generally the preferred cone angle is in the range of about 30 to 60 degrees. The cone angle is the angle made by a projection of the cone onto a flat plane. The resulting angle at the apex of the projected lines which define the cone is the cone angle. A smaller cone angle is preferred because less material must be removed in forming the keel tip. However, a greater degree of curvature may effect the signal quality produced as previously discussed. A smaller cone angle may also result in a more fragile tip region 4.

In the present invention, the keel tip is somewhat modified from that of the aforementioned Keizer patents. The prow 44 need not be an edge but may be a curved surface which is a portion of the conical tip region 4. The electrode surface 24 remote from the prow is generally not flat but rather is a portion of the cone surface. The bottom surface 34 is defined by the prow 44, the electrode 24, and the side surfaces 36 and 38.

The keel tip 32 may be fabricated by means of an abrasive coated deep groove lapping disc as described in Keizer. A preferred lapping abrasive coating is an $SiO_x$ layer prepared by a glow discharge deposition from $SiH_4$ and $N_2O$ precursors.

The electrode surface 24 may be made conductive by, for example, depositing a conductive metal coating such as titanium, hafnium and the like or implanting a layer of ions such as boron cations.

I claim:
1. A playback stylus for use with a capacitive information disc which has an information track recorded as geometric surface variations, wherein the stylus comprises:
   a dielectric support element having a conical end;
   two flats in the conical end;
   a constricted terminal portion defined by two side surfaces, shoulders interconnecting the two side surfaces and the two flats, a prow defined by a first conical region of said conical end between the flats, a second conical region of said conical end remote from the prow, and a surface defined by the prow, the two side surfaces, and the second region for engaging said disc; and
   a shank bonded to said dielectric support element remote from said constricted terminal portion;
   wherein the two flats are convergent, and intersect in said first region; and wherein the conical portion of said second conical region between said two side surfaces is an electrode surface.

* * * * *